United States Patent
Keeth et al.

(10) Patent No.: US 10,768,831 B2
(45) Date of Patent: Sep. 8, 2020

(54) NON-PERSISTENT UNLOCK FOR SECURE MEMORY

(71) Applicant: Micron Technology, Inc., Boise, ID (US)

(72) Inventors: Brent Keeth, Boise, ID (US); Naveh Malihi, University City, MO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/235,407

(22) Filed: Dec. 28, 2018

(65) Prior Publication Data
US 2020/0210077 A1    Jul. 2, 2020

(51) Int. Cl.
  *G06F 3/06* (2006.01)
  *G06F 21/62* (2013.01)

(52) U.S. Cl.
  CPC .......... *G06F 3/0622* (2013.01); *G06F 3/0659* (2013.01); *G06F 3/0673* (2013.01); *G06F 21/6245* (2013.01)

(58) Field of Classification Search
  CPC .... G06F 3/0622; G06F 3/0659; G06F 3/0673; G06F 21/6245
  See application file for complete search history.

(56) References Cited

U.S. PATENT DOCUMENTS

| | | | |
|---|---|---|---|
| 5,488,721 A | 1/1996 | Rich et al. | |
| 5,969,997 A * | 10/1999 | Clinton | G11C 11/409 365/189.02 |
| 6,034,889 A | 3/2000 | Mani et al. | |
| 6,804,730 B1 | 10/2004 | Kawashima | |
| 10,127,989 B2 | 11/2018 | Kurafuji | |
| 2004/0120187 A1 | 6/2004 | Kang | |
| 2004/0236919 A1 | 11/2004 | Okaue et al. | |
| 2004/0255145 A1 * | 12/2004 | Chow | G06F 12/1466 726/16 |
| 2007/0157029 A1 | 7/2007 | Mani | |
| 2008/0244208 A1 | 10/2008 | Narendra et al. | |
| 2014/0137271 A1 | 5/2014 | Hyde et al. | |
| 2017/0288867 A1 | 10/2017 | Collier et al. | |

FOREIGN PATENT DOCUMENTS

WO    99-27499    6/1999

OTHER PUBLICATIONS

International Search Report and Written Opinion for related PCT Application No. PCT/US2019/064716, dated Mar. 31, 2020, 11 pages.

* cited by examiner

*Primary Examiner* — Larry T Mackall
(74) *Attorney, Agent, or Firm* — Brooks, Cameron & Huebsch, PLLC

(57) ABSTRACT

Apparatuses and methods related to implementing a non-persistent unlock state for secure memory. Implementing the non-persistent unlock state can include verifying whether an access command is authorized to access a protected region of a memory array. The authorization can be verified utilizing a key and a memory address corresponding to the access command. If an access command is authorized to access a protected region, then a row of the memory array corresponding to the access command can be activated following the placement of the protected region in a non-persistent unlocked mode. If the row of the memory array corresponding to the access command is activated, then the protected region can be placed on a locked mode.

17 Claims, 5 Drawing Sheets

US 10,768,831 B2

NON-PERSISTENT UNLOCK FOR SECURE MEMORY

TECHNICAL FIELD

The present disclosure relates generally to memory, and more particularly to apparatuses and methods associated with implementing a non-persistent unlock for secure memory.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

Various computing systems include a number of processing resources that are coupled to memory (e.g., a memory system), which is accessed in association with executing a set of instructions (e.g., a program, applications, etc.). For various reasons, it can be desirable to prevent unauthorized access to memory (e.g., via read and/or write operations) or particular portions thereof. For instance, a memory system may store sensitive data (e.g., data desired to be kept secret, such as passwords, personal information, etc.).

DETAILED DESCRIPTION

Figure 1:
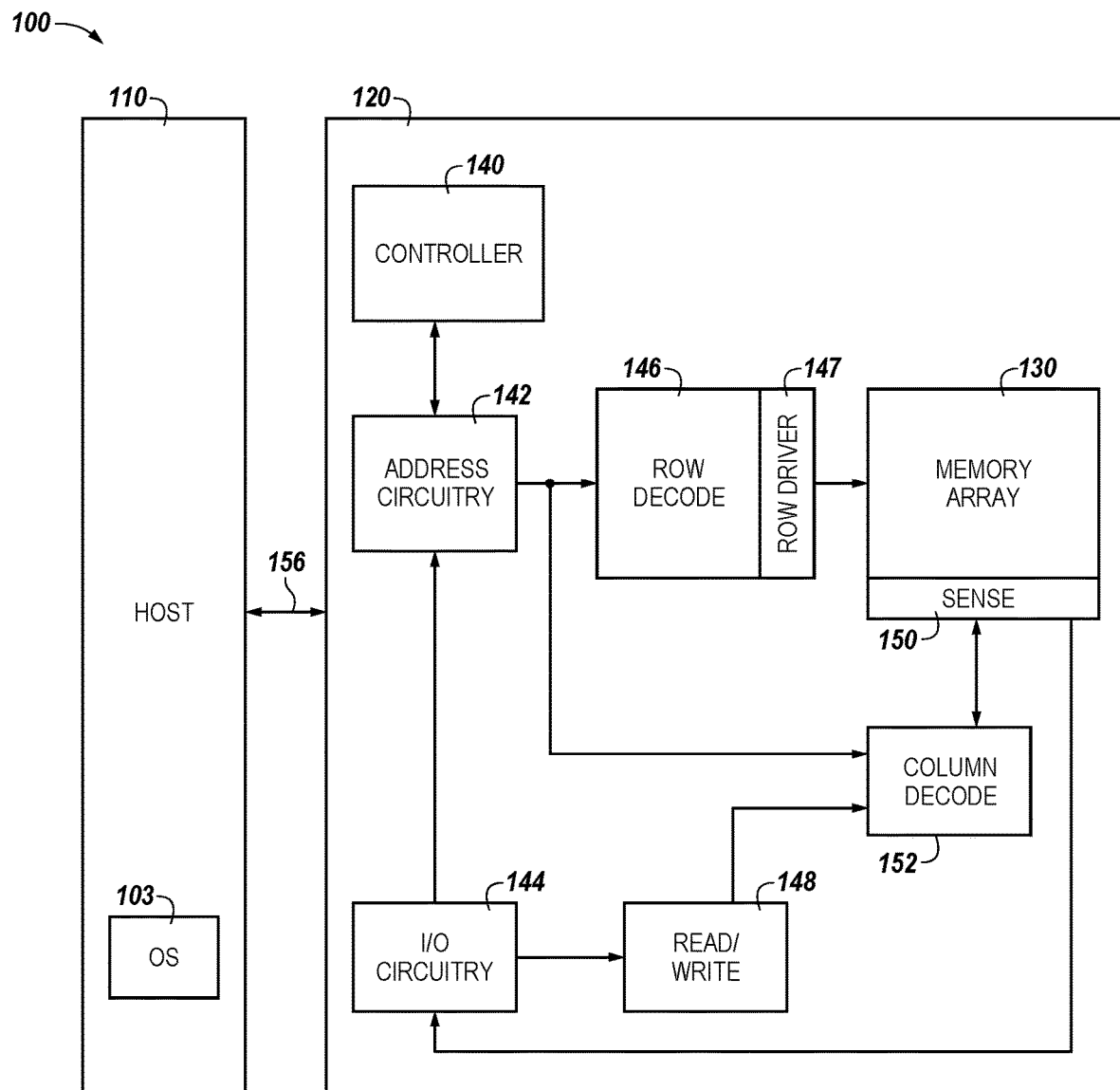
FIG. 1 is a block diagram of an apparatus in the form of a computing system including a memory device in accordance with a number of embodiments of the present disclosure.

The present disclosure includes apparatuses and methods related to implementing a non-persistent unlock state for secure memory. Access commands can be provided from a host to a memory device. The memory device may rely on the host for implementing security measures to prevent unauthorized access to the memory device. However, implementing security measures at the memory device may further improve security and may mitigate unauthorized memory accesses.

In various embodiments, a memory device can mitigate unauthorized memory accesses by verifying access commands as authorized utilizing credentials provided along with, or as part of, the access commands. The credentials can be stored in a plurality of registers implemented in the memory device prior to receipt of the access command (e.g., from a host). As used herein, an access command can include one or more commands. An access command can be one of a pre-charge command, an activate command, a read command, and/or a write command, among other possible commands. The access command can include one more commands including one or more of the pre-charge commands, the activate commands, the read command, and/or the write commands. In various embodiments, an access command can be propagated into a plurality of access commands. For example, an access command can be a read command which can be propagated into the access commands including a pre-charge command, an activate command, and a read command.

The authorization of an access command can be verified utilizing a key (e.g., credential(s)). The access command can request access to an address and/or a plurality of addresses. The memory device can determine whether the address is locked or unlocked based on a security mode associated with the address. If the address is locked, then the memory device can refrain from providing access to the address unless a key associated with the access command is also provided to the memory device. The key can be verified against a stored key to determine whether to unlock the address.

If the key matches the stored key, then the memory device can unlock the address and can provide access to the address(es). If the key does not match the stored key, then the memory device can refrain from providing access to the address(es).

In various examples, an initial authorized access command can result in an unlocking of a protected region of memory to allow access thereto (e.g., to a physical row). However, the protected region may not be re-locked until after a number of access commands have been executed, leaving the protected region in what may be referred to as a persistent unlocked state. While the protected region is unlocked, access commands may be capable of accessing the protected region (e.g., without having to be verified using a key).

A security feature, in accordance with a number of embodiments of the present disclosure, can include implementing a non-persistent unlocked state for the memory. As described further herein, a protected region of memory can be referred to as being in a non-persistent unlocked state when each access attempt (e.g., access command) is verified prior to being executed such that the protected region is not left in an unlocked state. For example, in a non-persistent unlocked state a key associated with each access command may be checked prior to granting access to a protected region of the memory by the command.

Implementing security measures at a memory device to prevent unauthorized access can increase the security of the memory device beyond the security which may be provided by a host. For example, unauthorized access commands may be prevented from accessing the memory device by security measures implemented at a host as well as by security measures implemented at a memory device.

In various examples, unauthorized access attempts can be detected, and data can be protected based on the detection. A security mode corresponding to a protected region of a memory array storing the data can be modified responsive to the detection of the unauthorized access attempts. The protected region can be placed in a first security mode from a second security mode where the first security mode is a more heightened security mode than the second security mode. The data can be moved to a different protection region and/or an unprotected region responsive to the detection of the unauthorized access attempts. In various examples, a power status of a computing device comprising the memory array can be modified responsive to the detection of the unauthorized access attempts. The computing device can be shut down or placed in a sleep state. Responsive to detecting the unauthorized access attempts, the memory device targeted by the access attempt or the computing device comprising the memory device can be locked to prevent access to the memory device and/or the computing device.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a computing system 100 including a memory device 120 in accordance with a number of embodiments of the present disclosure. As used herein, a memory device 120, a memory array 130, and/or host 110, for example, might also be separately considered an "apparatus."

In this example, system 100 includes a host 110 coupled to memory device 120 via an interface 156. The computing system 100 can be a personal laptop computer, a desktop computer, a digital camera, a mobile telephone, a memory card reader, or an Internet-of-Things (IoT) enabled device, among various other types of systems. Host 110 can include a number of processing resources (e.g., one or more processors, microprocessors, or some other type of controlling circuitry) capable of accessing memory 120. The system 100 can include separate integrated circuits, or both the host 110 and the memory device 120 can be on the same integrated circuit. For example, the host 110 may be a system controller of a memory system comprising multiple memory devices 120, with the system controller 110 providing access to the respective memory devices 120 by another processing resource such as a central processing unit (CPU).

In the example shown in FIG. 1, the host 110 is responsible for executing an operating system (OS) 103 and/or various applications that can be loaded thereto (e.g., from memory device 120 via controller 140). The host 110 may not be responsible for managing keys or addresses that define the protected region. The host 110 can provide access commands and/or security mode initialization commands to a memory device via the interface 156. In various examples, the memory device may provide an indication of an unauthorized access attempt. In various embodiments, the unauthorized access attempt can result in providing data to the host such that the issuer of the unauthorized access attempt is not notified of the memory device's identification of the unauthorized access attempt. The data received from the memory device 120 may not be the data stored by the memory cells having the address provided by the access command. The host 110 may receive data generated responsive to identifying the access command as unauthorized.

For clarity, the system 100 has been simplified to focus on features with particular relevance to the present disclosure. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines (which may be referred to herein as word lines or select lines) and columns coupled by sense lines (which may be referred to herein as digit lines or data lines). Although a single array 130 is shown in FIG. 1, embodiments are not so limited. For instance, memory device 120 may include a number of arrays 130 (e.g., a number of banks of DRAM cells).

The memory device 120 includes address circuitry 142 to latch address signals provided over an interface 156. The interface can include, for example, a physical interface employing a suitable protocol (e.g., a data bus, an address bus, and a command bus, or a combined data/address/command bus). Such protocol may be custom or proprietary, or the interface 156 may employ a standardized protocol, such as Peripheral Component Interconnect Express (PCIe), Gen-Z, CCIX, or the like. Address signals are received and decoded by a row decoder 146 and a column decoder 152 to access the memory array 130. Data can be read from memory array 130 by sensing voltage and/or current changes on the sense lines using sensing circuitry 150. The sensing circuitry 150 can comprise, for example, sense amplifiers that can read and latch a page (e.g., row) of data from the memory array 130. The I/O circuitry 144 can be used for bi-directional data communication with host 110 over the interface 156. The read/write circuitry 148 is used to write data to the memory array 130 or read data from the memory array 130. As an example, the circuitry 148 can comprise various drivers, latch circuitry, etc.

Controller 140 decodes signals provided by the host 110. These signals can include chip enable signals, write enable signals, and address latch signals that are used to control operations performed on the memory array 130, including data read, data write, and data erase operations. In various embodiments, the controller 140 is responsible for executing instructions from the host 110. The controller 140 can comprise a state machine, a sequencer, and/or some other type of control circuitry, which may be implemented in the form of hardware, firmware, or software, or any combination of the three.

In accordance with various embodiments, the controller 140 can be configured to decode a security mode initialization command received thereto. The security mode initialization command can be received from the host 110. The security mode initialization command can be provided to the memory device 120 to set a security mode of the memory device 120 and/or to designate one or more protected regions of the memory device 120. A security mode can include a locked mode and an unlocked mode. The memory device 120 can be configured to provide access to a protected region of the memory array 130 if the memory device 120 is in an unlocked mode or to prevent access to the protected region of the memory array 130 if the memory device 120 is in a locked mode.

The OS 103, as executed by the host 110, can initialize the security mode initialization command to store a key and an address or a range of addresses of the memory array 130 in one or more registers of the controller 140. The stored key and address can define the protected region of the memory array 130. The OS 103 can initialize the security mode initialization command during an initialization of the OS 103 or a time after the OS 103 is initialized.

The address received form the host 110 can be a logical address. A logical address can be translated, mapped, or resolved to a physical address. A logical address can include a virtual address, for example. The physical address may be used by the memory device 130 to access data from a memory array 130. The physical address can be directly mapped to a memory cells or row of the memory array 130. The logical address corresponding to the initialization command and/or access commands and received from the host 110 can be translated by the memory device 120 to generate the physical address. The physical address can be a physical row address of the memory array 130.

The key can be a security token used to gain access to a protected region of the memory array 130. The key can be encrypted or unencrypted. The key can be provided by the OS 103 and used by the OS 103 to access the protected region of the memory array 130. The key can be unique to a protected region of memory and/or can be associated with a plurality of protected regions of memory. As described further below, the key can comprise one or more bits which can be stored in one or more registers of the memory device 120.

The protected region of the memory array 130 describes a region of the memory array 130 that is protected using the key. The protected range can be defined by a first memory address and a second memory address. The first memory address can be a starting address and the second memory address can be an ending address. In various examples, the protected range is stored as a starting address and as an offset. The offset together with the starting address can be used to generate the ending address. The protected region can be continuous from the starting address to the ending address.

In various examples, the memory array 130 can comprise one or more protected regions. Each of the protected regions can be defined using a starting address and an offset. Each of the starting addresses corresponding to a different protected region can be unique and/or can be a same starting address. Each of the offsets can also be a same offset or a different offset.

In various instances, the host 110 can provide an access command and/or a plurality of access commands to the memory device 120. Access commands can be provided to access a protected region of the memory device 120. The access command can be associated with an address or a range of addresses and a key. The memory device 120 can compare the provided address to a protected range to determine whether the address is within the protected range. If the address is within the protected range, the memory device 120 can compare the key with a stored key to determine whether the key and the stored key match. If the key matches the stored key, then the memory device can enter a non-persistent unlocked mode from a locked mode. The memory device 120 can, via the controller 140, enable a row driver to activate a row of the memory array 130 corresponding to the address (e.g., protected region). Responsive to enabling the row driver, the memory device 120 can transition the protected region from a non-persistent unlocked mode to a locked mode. If the key does not match, the memory device 120 can, via the controller 140, prevent access to the protected region by preventing enablement of the row driver 147 of the memory array 130, thus preventing activation of a row corresponding to the access command.

Figure 2:
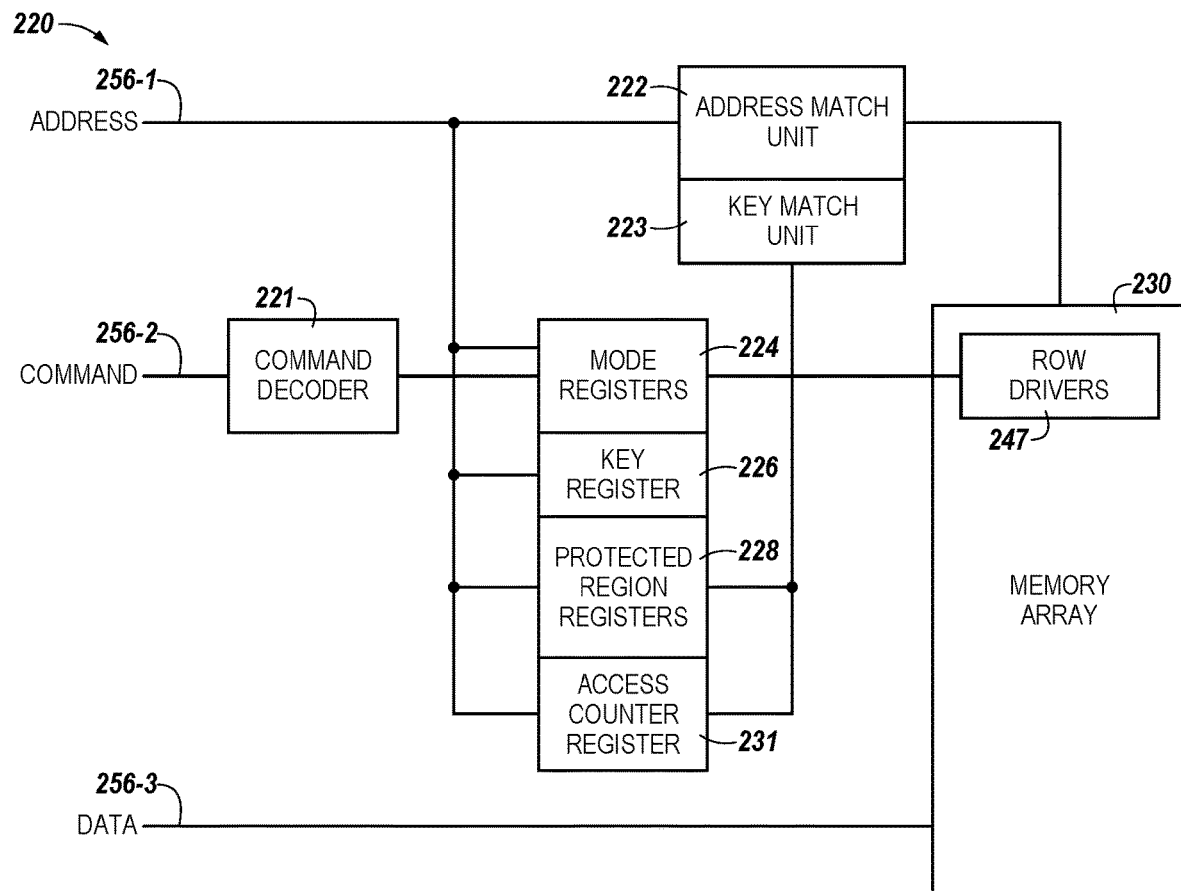
FIG. 2 is a block diagram of an apparatus in the form of a memory device including a memory array and portions of a controller capable of protecting regions of memory using a key in accordance with a number of embodiments of the present disclosure.

FIG. 2 is a block diagram of an apparatus in the form of a memory device 220 including a memory array 230 and portions of a controller capable of protecting regions of memory using a key in accordance with a number of embodiments of the present disclosure. The memory device 220 can be analogous to the memory device 120 in FIG. 1. The memory device 220 includes the memory array 230 and portions of a controller such as the controller 140 in FIG. 1.

The controller can include a command decoder 221, mode registers 224, a key register 226, protected region registers 228, and an access counter register 231. The controller can also include the address match unit 222 and a key match unit 223.

In this example, the interface (e.g., 156 shown in FIG. 1) comprises an address bus 256-1, a command bus 256-2, and a data bus 256-3. The device 220 can receive the security mode initialization command and/or access commands along with keys via the command bus 256-2. The device 220 can receive addresses via the address bus 256-1, and data can be provided to/from the device 220 via the data bus 256-3.

A host can provide, via the command bus 256-2, the security mode initialization command to initialize a security mode of the memory device 220. The memory device 220 can receive the security mode initialization command at the command decoder 221. The command decoder 220 can decode the security mode initialization command.

In various examples, the security mode initialization command can be associated with a key and a number of addresses received via the command bus 256-2 and the address bus 256-1. The controller can store a key in the key register 226 and can store the one or more addresses in the protected region registers 228. Each of the mode registers 224, the key registers 226, the protected region registers 228, and/or the access counter register 231 can be comprised of one or more registers.

The one or more addresses can be stored in the protected region registers 228 as a starting address and an offset. The starting address can be stored in a first register of the protected regions registers 228 and the offset can be stored in a second register of the protected region registers 228. The starting address and the ending address can define a protected region of the memory array 230 which can be stored in the protected region register 228.

The key can be stored in the key register 226. In various examples, a plurality of keys can be stored in one or more key registers including the key register 226. Each of the plurality of keys can be associated with a different one of the plurality of protected regions stored in the protected region registers including the protected region register 228. The plurality of keys can be used to allow access to the protected regions. For example, a first key can be used to allow access to a first protected region and a second key can be used to allow access to a second protected region.

Responsive to storing the key in the key register 226 and the address in the protected region register 228, the controller can change a security mode of the memory device 220 from an unlocked mode (e.g., persistent unlocked mode) to a locked mode in the mode registers 224. The mode registers 224 can include a security mode register. The security mode register can store a first value representing a persistent unlocked mode, a second value representing a non-persistent unlocked mode, and/or a third value representing a locked mode, among other possible modes. The locked mode can be used to prevent access to a protected region of the memory array 230. A persistent unlocked mode can be used to allow a plurality of instances of access to a protected region of the memory array 230 where a first access is provided contingent on a first key and the reminding instances of access are provided without verifying additional keys. A non-persistent unlocked mode can be used to allow a plurality of instances of access to the protected region of the memory array 230 where each instance of access is provided contingent on the verification of a different instance of a same key. In a non-persistent unlocked mode, each instance of access is followed by placing the protected region in a locked mode.

In various examples, responsive to receipt of the security mode initialization command, the controller can set or reset an access counter register 231. For example, the access counter register 231 can be set to zero. The access counter register 231 can provide a count of unauthorized access commands directed to the protected region of the memory array 230 (e.g., as defined by protected region register 228).

The controller can also process access commands. For example, an access command received via the command bus 256-2 can be decoded by the command decoder 221. The address match unit 222 can receive an address corresponding to the access command at the address match unit 222 of the controller. The address match unit 222 can determine whether the received address is within a protected region (e.g., as stored in the protected region register 228).

If the received address is in a protected region, then the controller, via the key match unit 223, can determine whether the key associated with the access command matches a key stored in the key register 226. If the key associated with the access command matches the key stored in the key register 226, then the controller can modify the mode registers 224 from a locked mode to a non-persistent unlocked mode.

The controller can provide a signal to the row drivers 247 to activate a row corresponding to the received address if the mode registers 224 reflect an unlocked mode (e.g., non-persistent unlocked mode or persistent unlocked mode). The controller can prevent a signal from being provided to the row drivers 247 if the mode registers 224 reflect a locked mode. Although the row drivers 247 are shown as being in the memory array 230, the row drivers 247 can also be implemented externally to the memory array 230 as shown in FIG. 1.

Responsive to providing a signal to the row drivers 247 while the protected region is in an un-persistent unlocked mode, the controller can place the protected region in a locked mode. In various embodiments, responsive to providing a signal to the row drivers 247 while the protected region is in a persistent unlocked mode, the controller may refrain from placing the protected region in the locked mode. In various examples, the controller may refrain from placing the protected region in the locked mode until a plurality of associated access sum-commands have been processed. For example, the controller may refrain from placing the protected region in the locked mode until a pre-charge command, an activate command, and a read command or a write command (e.g., access commands) have been processed by the controller.

An access command can be unauthorized if the key corresponding to the access command does not match a key stored in the key register 226. A key associated with the access command can be determined to not match a key stored in the key register 226 if no key is associated with the access command or if the key associated with the access command 226 does not have the same value as the key stored in key register 226. In some examples, a mismatch of the keys can be determined if the key stored in the key register 226 cannot be derived from the key associated with the access command. A key stored in the key register 226 can be derived from the key associated with the access command through an encryption process and/or a decryption process. In some instances, a key can be encrypted before being stored in the key register 226. The key associated with the access command may be unencrypted. Comparing an encrypted key with an unencrypted key can include decrypted an encrypted key and comparing the decrypted key with the unencrypted key. The encrypted key can be derived from the unencrypted key if the decrypted key matches the unencrypted key.

Figure 3:
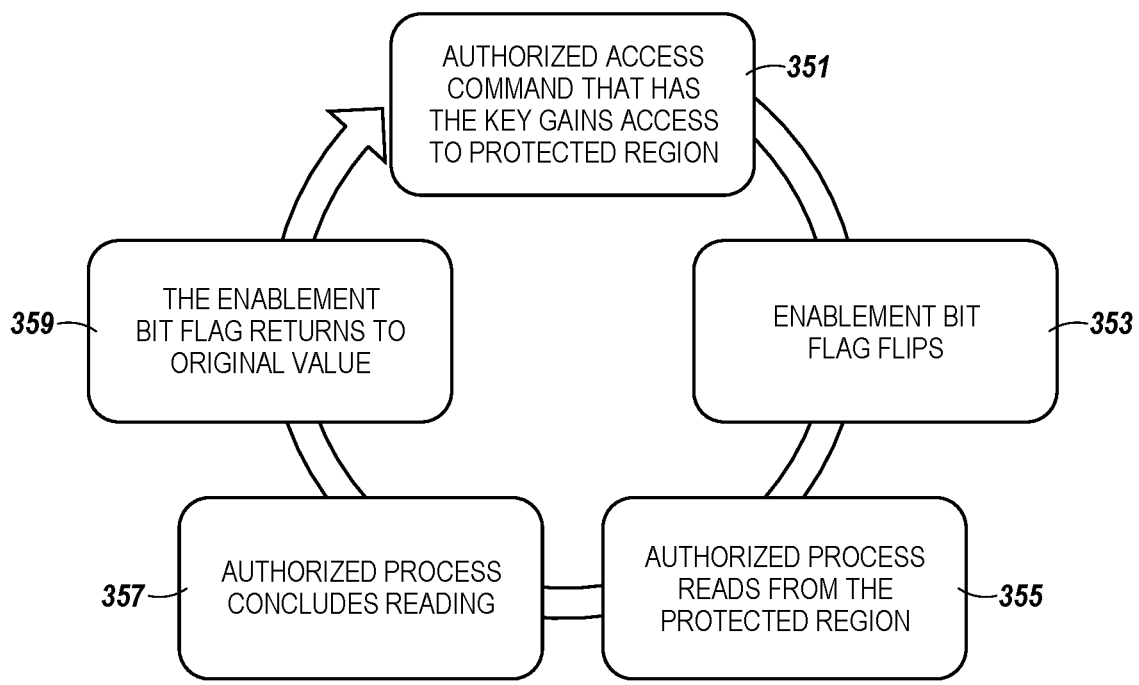
FIG. 3 illustrates an example flow diagram of a method for accessing a protected region of a memory array in accordance with a number of embodiments of the present disclosure.

FIG. 3 illustrates an example flow diagram of a method for accessing a protected region of a memory array in accordance with a number of embodiments of the present disclosure. At 351, the access command that has the key gains access to the protected region. The access command can be provided by a program that is being executed by the host such as an application process, an OS, a hypervisor, and/or a virtual machine (VM). For example, the access command can be provided by an OS and/or a different application, among other possible processes. The access command can be authorized upon verifying that a key associated with the access command and provided by a process matches a stored key in the key register.

At 353, the enablement bit flag can be flipped. The enablement bit flag can be stored in a security mode register show in FIG. 2 as one of the mode registers 224. The enablement bit flag can be flipped from a locked mode to a non-persistent unlocked mode. At 355, the authorized process can read from the protected region of memory. The access command can be a read command or a write command, among other possible access commands. The controller can prevent enabling a row driver from activating a row responsive to the enablement bit flag indicating the locked mode, where the row corresponds to a received address associated with the access command. For example, the controller can prevent any row driver enablement when the mode bit indicated that a secured memory region is locked. In various examples, the controller can set the security mode register to a locked mode responsive to enabling the row driver and responsive to a prior state of the security mode register being a non-persistent locked mode. In other examples, the controller can reframe from setting the security mode register to a locked mode responsive to enabling the row driver and responsive to a prior state of the security mode register being a persistent locked mode. In a different embodiment, the controller can set the security mode register to a locked mode responsive to enabling the row driver and regardless of whether the prior state of the security mode register was a non-persistent locked mode or a persistent locked mode.

At 357, the authorized process can conclude reading from the protected region. At 359, the controller can return the enablement bit flag to its original value. For example, the enablement bit flag can be returned to a locked mode.

In various embodiments, an OS, hypervisor, and/or virtual machine can initiate a security mode initialization command. The security mode initialization command can be provided by the OS to define a protected region of a memory array and to associate a key with the protected region.

Defining a protected region utilizing the security mode initialization command provides the OS flexibility. The OS can have flexibility to define the size and content of a protected region of the memory array. For example, the OS can define the protected region as comprising a first size or a second size, among a number of other sizes. The OS can activate a security mode by providing the security mode initialization command or can refrain from activating the security mode by refraining from providing the security mode initialization command to the memory device.

A memory device can function in a security mode or without the security mode based on the OS's selection. Further, the OS can define a size or location of the protected region after the protected region has been initialized. For example, after initialization of a security mode, the OS can increase the size of the protected region or decrease the size of the protected region. After initialization of a security mode, the OS can also change a base address of the protected region and/or an offset of the protected region. The OS can also exit the security mode after the memory device has been placed in the security mode. For example, the OS can store a predefined value in the protected region registers. The OS can store a zero as a base address and/or an offset of the protected region to exit the security mode.

The OS can utilize an application programming interface (API) to generate the security mode initialization command and/or an access command used to define and/or access a protected region of the memory array. The OS can comply with the security features of the memory device utilizing the API.

In various examples, the security mode initialization command can be generated by the OS and/or received by the memory device as part of an initialization process of a computing device and/or the OS. The memory device can store a key in a key register responsive to receiving the security mode initialization command. The memory device can store an address of a memory device in a protected region register. The memory device can set a mode register based on the storing of the key and/or the storing of the address. The mode register can identify whether a region of the memory array is protected. The memory device can set the mode register to a locked mode. The locked mode can be a protected mode. The mode register can also be set to a persistent unlocked mode or a non-persistent unlocked mode.

Figure 4:
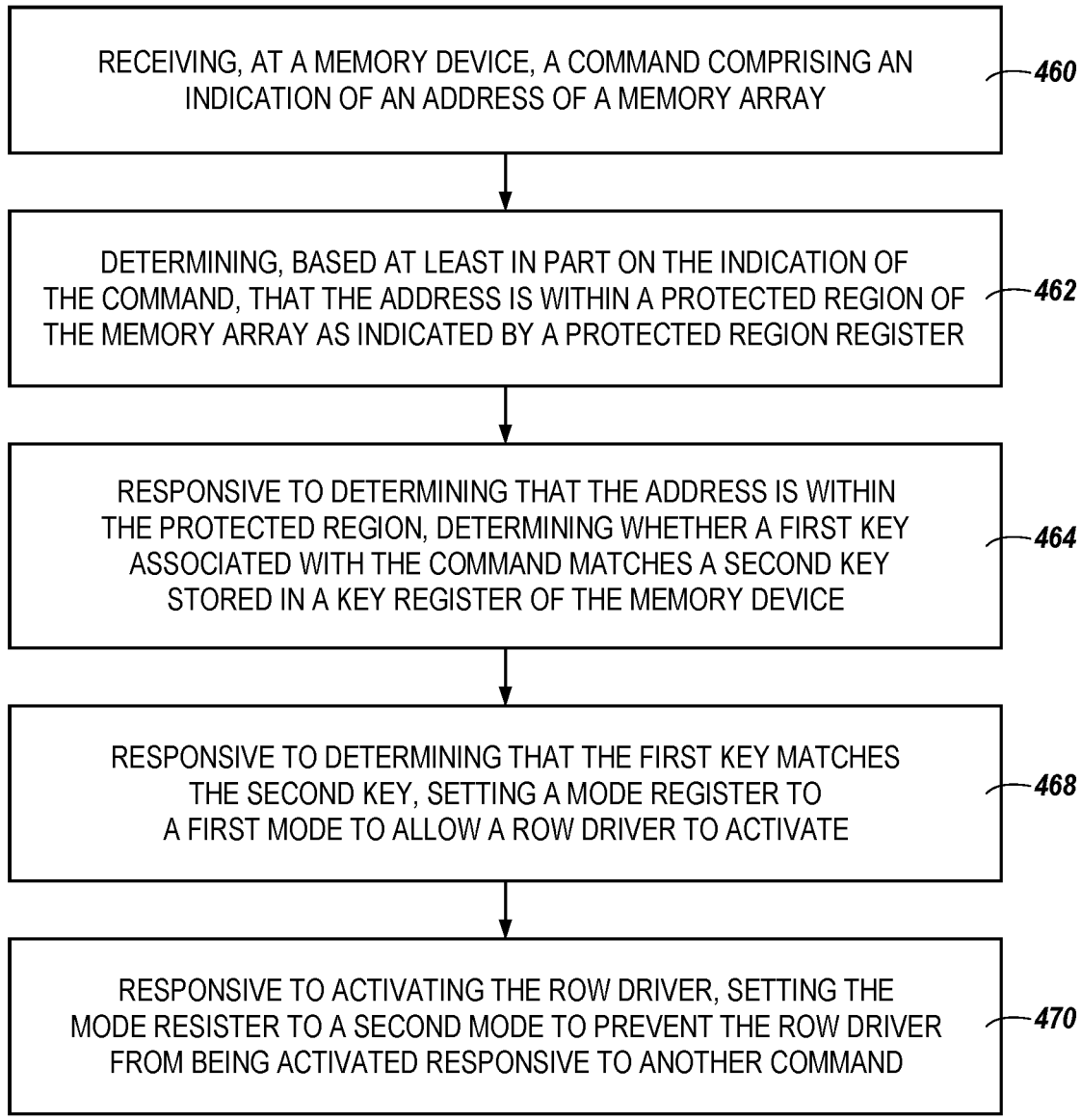
FIG. 4 illustrates an example flow diagram of a method for accessing a protected region of a memory array in accordance with a number of embodiments of the present disclosure.

FIG. 4 illustrates an example flow diagram of a method for accessing a protected region of a memory array in accordance with a number of embodiments of the present disclosure. The method can be executed by a memory device of a computing system.

At 460, a memory device can receive a command comprising an indication of an address of a memory array to access. At 462, a determination can be made, based at least in part on the indication in the command, as to whether the address is within a protected region of the memory arrays as indicated by a protected region register. The address can be within the protected region if the address is greater than a starting address of the protected region but less than the ending address of the protected region. In various examples, the access command can be associated with a plurality of addresses to access. The plurality of addresses can be within the protected region if at least one of the plurality of addresses is greater than a starting address and at least one of the of the plurality of addresses is less than the ending address of the protected region.

At 464, responsive to determining that the address is within the protected region, the controller can determine whether a received key associated with the access command matches a key stored in a key register of the memory device. The received key can match the stored key if the received key is equal to the stored key or if the received key is substantially equal to the stored key. The received key can be substantially equal to the stored key if the stored key can be derived from the received key.

At 468, responsive to determining that the received key matches the stored key, the controller can set a mode register to a first mode (e.g., a non-persistent unlocked mode) to allow a row driver to activate. The memory device can allow access to the address by providing the data stored at memory cells having the address to the host. Access can be allowed by allowing an activation of a row of the array corresponding to the address. The method can further allow activation of a row to which the address corresponds by switching an access enable flag from a second state to a first state, wherein rows corresponding to addresses within the protected region are not activatable unless the access enable flag is in the first state. The first state (e.g., first mode) can correspond to the non-persistent unlocked mode. The second state (e.g., second mode) can correspond to a locked mode.

At 470, responsive to activating the row driver, the mode register can be set to e.g., second mode (e.g., a locked mode) to prevent the row driver from being activated by different access commands. The mode register can be set to a second mode to prevent the row driver from being activated by different access commands regardless of whether the different access commands are associated with the authenticated access command. For example, the authenticated access command can be an activate command and a different access command can be a read command.

The mode register can be set to the first mode to allow the row driver to activate a row of the memory array corresponding to the address. The mode register can be set to the second mode responsive to activating the row of the memory array.

In various examples, a different access command to the address can be received, wherein the different access command is associated with a third key. The third key can be independent of the second key. For example, the third key can be provided independently of the second key and can correspond uniquely to the different access command. A controller can determine whether the address is within the protected region of the memory array as indicated by the protected region register. Responsive to determining that the address is within the protected region, the controller can determine whether the third key associated with the different access command matches the second key stored in the key register of the memory device. Responsive to determining that the third key matches the second key, the controller can set the mode register to the first mode to allow the row driver to activate. Responsive to activating the row driver, the controller can set the mode register to the second mode to prevent the row driver from being activated. Each access command can be authenticated independently and the protected region of the array can be set to a second mode before a different access command is processed by a controller.

In various examples, the mode register can be set to a second mode if the address is not within the protected region or if the key does not match the second key. The mode register can be set to a second mode even if the mode register was already in a second mode. In other examples, the controller can refrain from modifying the mode register if the address is not within the protected region or the key does not match the second key.

In various embodiments, a different access command to an activated row can be received at a memory device, where the different access command is associated with the address. The controller can determine whether the address is within the protected region of the memory array as indicated by the protected region register. Responsive to determining that the address is within the protected region, the controller can determine whether the third key associated with the different access command matches the second key stored in the key register of the memory device. Responsive to determining that the third key matches the second key, the controller can set the mode register to the first mode to allow the row driver to activate. Responsive to activating the row driver, the controller can set the mode register to the second mode to prevent the row driver from being activated. Access commands, that are received and/or processed while a targeted row of the array is activated, can be authenticated prior to processing the access commands.

In various examples, a second access command that was generated from the propagation of a first access command can be authenticated prior to processing the second access command. Responsive to receiving the access command from the host, the controller can determine whether an address corresponding to the access command is in a protected region of the memory. Responsive to determining that the address is in the protected region, the controller can determine whether a stored key corresponding to the access command matches a received key stored in a key register of the memory device. Responsive to determining that the stored key matches the received key, the access command can be propagated into a plurality of access commands. For example, a read command (e.g., access command) can be propagated into a pre-charge command, an activate command, and a read command (e.g., access commands). The write command (e.g., access command) can be propagated into a pre-charge command, an activate command, and a write command (e.g., access commands). The plurality of access command can be processed based on the authentication of the access command.

In various examples, memory utilizing board side addressing can propagate access commands from an access command. Some examples of memory that utilize broad side addressing include reduced latency dynamic random-access memory (RLDRAM), hybrid memory cube (HMC) memory, and static random-access memory (SRAM), among other examples of memory that utilize board side addressing.

Responsive to determining that the stored key does not match the received key, a memory device may refrain from propagating the access command. By not propagating the access command, the access command is not processed to conclusion and the access to the protected region of the memory device is rejected given that the propagated access commands were not created.

In propagating the access command, the address and/or the key corresponding to the access command can be associated with each of the propagated access commands. Responsive to determining that the address is in the protected region, a memory device can determine whether the received key associated with each of the plurality of access commands matches the stored key. The memory device can be configured to, prior to processing each of the plurality of access commands, set a mode register to a first mode to allow for a row decoder to activate rows of the memory array based on whether the received key associated with each of the plurality of access commands matches the stored key.

Responsive to activating a row of the memory array as part of the processing of the plurality of access commands, the memory device can set the mode register to a second mode to prevent the row decoder from activating rows of the memory array. As such, the mode register can be set to a first mode prior to providing access to the protected region for each of the plurality of access commands. The mode register can also be set to a second mode following access to the protected region for each of the plurality of access commands. That is, after processing each of the plurality of access commands, the memory device can set the mode register to a second mode to prevent the row decoder from activating a row of the memory array by other access commands from the plurality of access commands or by access commands not propagated from the access command.

In various examples, the memory device can further be configured to, responsive to determining that the received key does not match the stored key, set a mode register to a second mode to prevent a row decoder from activating a row of the memory array in view of the access command. If the received key does not match the stored key, the access command may not be propagated and the mode register may be placed in a second mode.

The plurality of access commands can be accessed sequentially regardless of whether the access commands were or were not propagated from an access command. Providing sequential access can include providing a first access to a protected region of memory in conjunction with the processing of a first access command prior to providing a second access to a protected region of the memory in conjunction with the processing of a second access command. Each access command can be authenticated before access to a protected region is granted and different instances of access to a protected region may not be simultaneously granted.

Figure 5:
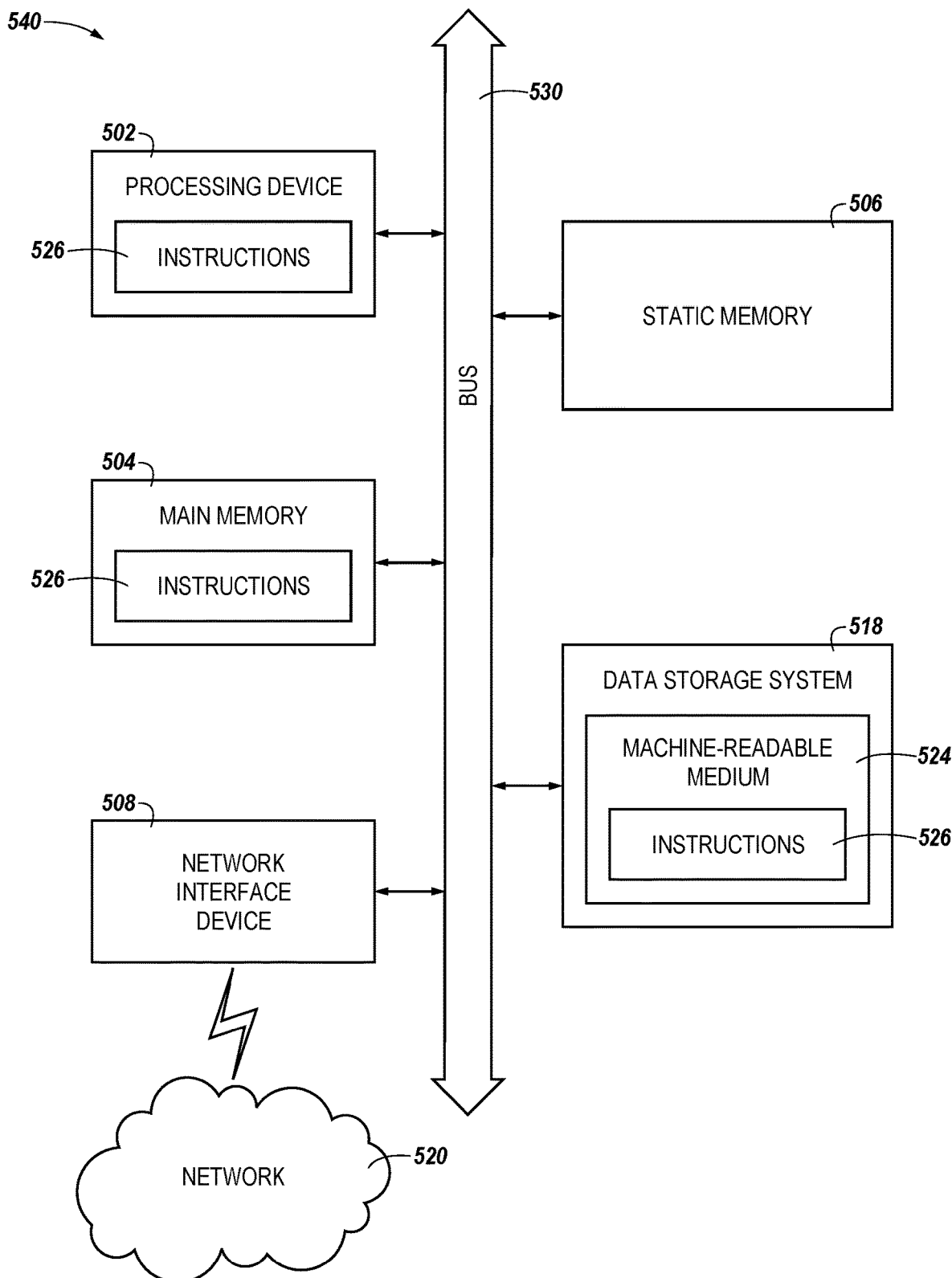
FIG. 5 illustrates an example machine of a computer system within which a set of instructions, for causing the machine to perform various methodologies discussed herein, can be executed.

FIG. 5 illustrates an example machine of a computer system 540 within which a set of instructions, for causing the machine to perform any one or more of the methodologies discussed herein, can be executed. In various embodiments, the computer system 540 can correspond to a host system (e.g., the system 110 of FIG. 1) that includes, is coupled to, or utilizes a memory sub-system (e.g., the memory device 120 of FIG. 1) or can be used to perform the operations of a controller (e.g., the controller 140 of FIG. 1, including the register 224, 226,228, and 231 of FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 540 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 540 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 540, the main memory 504 and the processing device 502 also constituting machine-readable storage media.

In one embodiment, the instructions 526 include instructions to implement functionality corresponding to the controller 140 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    a memory array;
    a key register configured to store a key used to determine whether a plurality of access commands are allowed access to a protected region of the memory array, wherein the plurality of access commands are collectively executable to access data stored in the memory array or write data to the memory array;
    a protected region register configured to store addresses defining the protected region;
    control circuitry configured to, responsive to receiving the plurality of access commands:
        determine whether to allow access to an address corresponding to the plurality of access commands based on:
            whether the address is within the protected region; and
            whether a plurality of keys corresponding to the plurality of access commands match the key stored in the key register;
        responsive to determining to allow access to the address, set a mode register to a first mode to enable a row driver; and
        responsive to determining not to allow access to the address, set the mode register to a second mode to disable the row driver.

2. The apparatus of claim 1, wherein the plurality of access commands correspond to an access command received by the control circuitry from a host.

3. The apparatus of claim 1, wherein the control circuitry is configured to receive the plurality of access commands and wherein each of the plurality of access commands is associated with a different one of the plurality of keys.

4. The apparatus of claim 1, wherein the control circuitry is further configured to determine whether each of the plurality of keys matches the key prior to allowing access to the address.

5. The apparatus of claim 1, wherein the plurality of access commands are configured for sequential execution in association with accessing the memory array.

6. The apparatus of claim 1, wherein the control circuitry is configured to provide access to the address independently for each of the plurality of access commands.

7. The apparatus of claim 1, wherein each of the plurality of access commands is one of a pre-charge command, an activate command, a read command, or a write command.

8. A method comprising:
receiving, at a memory device, a command comprising an indication of an address of a memory array;
determining, based at least in part on the indication in the command, that the address is within a protected region of the memory array as indicated by a protected region register;
responsive to determining that the address is within the protected region, determining whether a first key associated with the command matches a second key stored in a key register of the memory device;
responsive to determining that the first key matches the second key, setting a mode register to a first mode to enable a row driver; and
responsive to enabling the row driver, setting the mode register to a second mode to disable the row driver.

9. The method of claim 8, further comprising setting the mode register to the first mode to allow the row driver to activate a row of the memory array corresponding to the address.

10. The method of claim 8, further comprising:
receiving a subsequent command to the address, wherein the subsequent command is associated with a third key;
determining whether the address is within the protected region of the memory array as indicated by the protected region register;
responsive to determining that the address is within the protected region, determining whether the third key associated with the subsequent command matches the second key stored in the key register of the memory device;
responsive to determining that the third key matches the second key, setting the mode register to the first mode to enable the row driver; and
subsequent to activating the row driver, setting the mode register to the second mode to disable the row driver.

11. The method of claim 8, wherein responsive to determining that the address is not within the protected region or that the key does not match the second key, setting the mode register to the second mode.

12. The method of claim 8, wherein responsive to determining that the address is not within the protected region or that the key does not match the second key, refrain from modifying the mode register.

13. The method of claim 8, further comprising:
receiving a subsequent command to an activated row, wherein the subsequent command is associated with the address;
determining whether the address is within the protected region of the memory array as indicated by the protected region register;
responsive to determining that the address is within the protected region, determining whether the third key associated with the subsequent command matches the second key stored in the key register of the memory device;
responsive to determining that the third key matches the second key, setting the mode register to the first mode to enable the row driver; and
subsequent to activating the row driver, setting the mode register to the second mode to disable the row driver.

14. A system, comprising:
a host comprising a processing resource configured to execute an operating system (OS); and
a memory device configured to:
responsive to receiving an access command from the host, determine whether an address corresponding to the access command is in a protected region;
responsive to determining that the address is in the protected region, determine whether a second key corresponding to the access command matches a first key stored in a key register of the memory device;
responsive to determining that the second key matches the first key set a mode register to a first mode to enable a row driver;
and
responsive to determining that the second key does not match the first key, set the mode register to a second mode to disable the row driver.

15. The system of claim 14, wherein the memory device is further configured to:
associate the address with each of the plurality of access commands; and
responsive to determining that the address is in the protected region, determine whether the second key associated with each of the plurality of access commands matches the first key.

16. The system of claim 14, wherein the memory device is further configured to process the plurality of access commands based on the second key provided with the access command.

17. The system of claim 16, wherein the memory device is further configured to, after processing each of the plurality of access commands, set the mode register to the second mode to prevent the row decoder from activating rows of the memory array.

* * * * *